Patented Sept. 19, 1944

2,358,761

UNITED STATES PATENT OFFICE 2,358,761

ADHESIVE SHEET MATERIALS

Raymond E. Reed, Norwood, Mass., assignor to The Kendall Company, Boston, Mass., a corporation of Massachusetts No Drawing. Application August 3, 1940, Serial No. 351,242

6 Claims. (Cl. 117—122)

This invention relates to adhesive tape products which are adapted for various uses as pressure-sensitive and other adhesive tapes, and to methods of manufacturing such goods.

It is the chief object of the invention to provide novel adhesive tapes which include backings composed of or including fibrous material and fabricated in such manner that the backings have particular internal and surface characteristics, adapting them, when combined with suitable adhesive masses, for general or for specialized adhesive tape uses, depending upon the individual product. Another object of the invention is the production of a tape for general use, with an unwoven backing material which is less expensive and better than usual woven textile backing materials, and is competitive from a price standpoint with paper tapes, yet one which may have properties of strength (wet or dry) and of moisture and solvent resistance far superior to present-day commercial paper tape. For specialized uses, tapes manufactured in accordance with this invention are an important contribution to the adhesive tape art and possess novel attributes, afforded for the most part by their distinctive internal and surface characteristics, both physical and chemical, which characteristics can be controlled, due to the methods of fabricating the tape. The preferred method has in fact universal application in the preparation of a variety of tapes, each individually adapted for specialized uses. For instance, the chemical characteristics of the tape, either internal, external, or both, may be such that the tape has special efficacy when used under conditions of heat or in the presence of moisture, or of other corrosive or discoloring agents, liquid gaseous, or solid, such as solvents, acids, alkalies, or when used as electrical insulation. Likewise, the internal and external physical characteristics, or both, of the tape may be so controlled that an adhesive tape having special efficacy as a heat insulator, or as a sound insulator, may be produced. By a control of either the physical characteristics of the tape backing alone, or of the chemical characteristics alone, or by a combined control of both, various types of pressure-sensitive adhesive masses may be affixed thereto sufficiently firmly to permit repeated unrolling and rerolling of the tape without commercially detrimental "picking" of the adhesive, and to permit repeated re-use of the tape after initial application.

In its simplest adhesive tape form, the invention may comprise an adhesive-bearing structure composed of intermingled unspun or heterogeneously arranged fibers, bonded to each other in a controlled and predetermined manner to form a unitary coherent sheet material, but one having particular internal and surface characteristics provided by a control of the kinds and proportion of chemically different textile fibers going to make up the sheet backing.

By reason of such control, a backing is produced which is inherently ideal for use as a pressure-sensitive adhesive tape, inasmuch as the surface characteristics are, or may be, fundamental in determining the adhesive receptive and retaining properties of the surface of the backing which is to receive the adhesive, as well as such physical properties as strength, tear resistance, density, softness, drape, and porosity, and such chemical properties as resistance to external influences.

The backing material which forms an essential part of the tape of this invention may be a fibrous structure, formed, in accordance with the preferred practice of the invention, by mixing fibers of predetermined character and in predetermined proportion, and forming the fibers into webs, and thereafter uniting the fibers in such manner as to produce a coherent unitary body or mass of predetermined strength, softness, resilience, flexibility, density, absorbency, fiber content, and fiber location.

The backing may be prepared, in one embodiment of the invention, from a mixture of non-binder textile fibers, of the usual character, such as cotton, wool, silk, or rayon, and of binder fibers having such coalescing properties under the action of re-agents or under specific conditions, to be further described, that the binder fibers act to maintain the unwoven web of binder and non-binder fibers in a unitary structure having the requisite flexibility, strength and coherency for use in the manufacture of adhesive tapes of this invention, whether the adhesive be of the pressure-sensitive, heat-sensitive or solvent-sensitive type.

In accordance with this invention, desirable backing materials can be made by mixing fibers potentially adapted to act as binders, even though normally not exhibiting such characteristics, with non-binder fibers, and thereafter forming separate webs or bats, and then uniting the bats through the action of some appropriate agent, such as heat, which serves to activate the binder fibers and thus to make them bond to the non-binder fibers and/or to each other. For example, textile fibers of cellulose acetate, suitably plasticized if desired, depending upon the particular type of subsequent binding operation, may be mixed and dry-assembled with cotton fibers in desired proportions in a carding machine, garnet, beater lapper, or some other machine adapted to mix the fibers commercially, and preferably, also, to work the mixture into the form of a web, bat or other fibrous body of the desired form, and perhaps of the desired dimensions. During this operation the different kinds of fibers become intimately commingled so that when this mixture is subsequently heated, or subjected to the action of some other softening agent for the cellulose acetate fibers, their normally latent adhesive, coalescent, or other binder characteristics are developed and they can then be made to adhere to, or to bond with, the cotton fibers, or to each other. Such action may be promoted by pressing the fibrous body while the binder fibers are still in a softened condition. These operations result in a firm bond between adjacent fibers throughout the backing, fibers in one preliminary web being intertwined and intermeshed with fibers of an adjacent web or webs when the webs are brought together preparatory to the bonding step. The individuality of the separate preliminary webs thus substantially disappears and the coherency of the backing is enhanced by its final substantially non-laminar structure, there being no defined plane of cleavage through the backing.

After the activating step has been completed, the fibers are so united that no substantial movement of them out of the relationship determined by the unifying step takes place. Thus, the resulting product has a strong resistance to physical and chemical disruptive forces. As will be seen, by this process, no specific arrangement or organization of the fibers is required, except initially to produce the intermingling necessary to distribute the binder constituent substantially uniformly through each batch, or to distribute the binder fibers in a predetermined manner.

If, however, some incidental orientation of the fibers occurs in connection with the mixing operation or the working of the fibrous mass into the form of a web or other shaped body, that factor is not objectionable from the standpoint of this invention. In fact, some such arrangement of the fibers usually occurs necessarily in performing this mixing operation in textile machines of the common forms. For example, a cotton card produces some parallelizing of the fibers and it should be understood that in the subsequent use of such terms as "unarrayed," "unspun," or "heterogeneously arranged," it is intended to include carded or garnetted webs, or those made by other dry-assembling processes, in which either some intentional or some incidental parallelization or arrangement of the fibers may take place, these terms being intended to distinguish from spun, woven, braided, knitted, or similar structures, the integrity of which depends solely upon some specific arrangement of fibers or yarns.

While some definite organization of fibers may be made for the purpose of this invention, such as a longitudinal orientation for obtaining a high lengthwise tensile strength per unit of weight or of density, the integrity of the product does not depend alone on such an arrangement but rather on the union or coalescence of the fibers. In this connection it may also be pointed out that while a card usually is fed from a lap previously made in a picker and the mixing of the fibers takes place largely in the latter, nevertheless a card is very useful in this process because of the fact that it works the mixture of fibers into a web admirably adapted for the subsequent coalescing operation.

A very considerable class of fibers, suitable for use as binders and desirable from the standpoint of adhesive tape use, is available. For example, various fibers comprising esters and ethers of cellulose, are suitable, such as those made of cellulose acetate, cellulose formate, cellulose propionate, cellulose butyrate, ethyl cellulose, and benzyl cellulose. Fibers made of mixed esters, such as cellulose acetate-propionate, also are very useful. Others of an entirely different chemical nature, however, may be used, such as those made of vinyl polymers, such as poly-vinyl acetate, polyvinyl chloride, polyvinyl acetate-chlorides, and those of the polyamide type, an important example of which is that known commercially as nylon. The binder fiber in each card may be of a single kind or may be a mixture of different kinds of binder fibers.

In fact, as many as three or more kinds of binder fibers may be present in the completed product, as well as more than one kind of non-binder fiber. The invention is not limited to any particular kind of binder fibers provided they have those characteristics suited to the purposes of the formation of the backing material. Necessarily, the particular kind or kinds of fibers used will be selected in accordance with the requirements of the contemplated use for the tape and the contemplated adhesive coating. For the usual types of water-insoluble pressure-sensitive adhesives, comprising either rubber-resin mixtures or rubber-substitute resin mixtures, a most satisfactory backing is one in which cotton fiber forms one constituent and a single kind of cellulose acetate binder fiber, either with or without a plasticizer, is used.

For the non-binder fibers, any of those commonly used in the textile industry may be employed satisfactorily, although here again, they will naturally be selected in accordance with the requirements of the particular backing to be made and in accordance with the contemplated adhesives to be united therewith. Cotton fiber, either bleached or unbleached, appears to be more commonly desirable than any other, but wool, silk, rayon of the regenerated cellulose type, such as viscose, asbestos, glass, the recent rubber fiber and others, or mixtures thereof, are entirely suitable for use in this process. It may here be pointed out, however, that fibers of certain kinds may act as binders under some conditions and as non-binder fibers under others. In other words, fibers of the same general chemical character may have different thermoplastic or other physical properties due, for example, to the fact that some of them have been treated with plasticizers so that they will soften at a lower temperature or will respond selectively to a softening or activating agent. Thus fibers of superficially identical chemical nature may be mixed, some of them serving as binder fibers while the others function as non-binder fibers.

It may also be observed that all the fibers above mentioned, both binder and non-binder, may be of the general nature of those used in the manufacture of textiles in textile machinery of common commercial types, and that, consequently, these fibers may aptly be called "textile fibers." It will be seen that the fact that the thermoplastic or binder fibers are of textile length, and have textile characteristics, as well as the cotton, wool, silk or other fibers with which they are mixed, is an important advantage of the present invention, for the reason that it makes it possible to mix the fibers and work them into the form of a fleece, web, or pad, in ordinary textile machines, such as pickers, cards, and other machinery, used in producing fibrous bodies of the type above mentioned, and to get the advantages of the resulting structure.

The invention presents wide opportunity for choice of fibers depending upon particular requirements of shrinkage, non-inflammability, strength, and moisture, temperature and solvent resistance of the finished adhesive tape.

For instance, a tape which has a backing high in, say, cotton non-binder type fiber content, and of a considerable thickness and bulk, finds use in metal construction as an interliner between metal panels, to prevent squeaks, to cushion moving parts generally, and at the same time to perform, if necessary, insulating functions.

In other instances, where a tape having a permeable and moisture retaining back surface is desired, the cards may include a high proportion of non-binder, water-wettable fibers. In such cases, slip-sheeting may be required with pressure-sensitive adhesive coatings, as a soft, fluffy back surface may cause objectionable difficulties in removing the tape from a roll. Likewise solvent spreading of the adhesive, as distinguished from calendering of a viscous plastic adhesive, will probably be necessary.

At other times the tape may be fabricated with an eye to providing a back surface highly receptive to printers' and other types of inks.

On the other hand, moisture resistant backing may have, for example, a high binder fiber content of individual moisture resistant fibers, as of cellulose esters or cellulose ethers, and thus be made almost impermeable to water, and certainly highly resistant to moisture. The greater the non-permeability that is desired, the greater the concentration of non-water-wettable fibers should be.

Other types of resistance may be obtained. For instance, if a tape is being manufactured for use as a protective covering against acids or alkalies, polyvinyl ester fibers may be included in large percentage. High concentration of ethyl cellulose fibers would insure resistance and stability of the tape against strong alkalies and dilute acids. Other tapes can be made risistant to air impurities, such as sulphur dioxide and hydrogen sulphide, to preserve burnished surfaces, or can be made immune to bacteria or fungus growths by choosing initially fibers having these characteristics and incorporating them in high concentration.

The operation of unifying the fibrous mass into a coherent structure should be controlled in accordance with the nature of the binder and the non-binder fibers used, the proportions of such fibers and the characteristics of the final product desired. During the mixing step these fibers can be in a dry, free condition suitable for dry assembly, picking, carding or like processes. Consequently, the process of unification necessarily requires that the binder fibers be softened to a suitable degree. Any appropriate activating agent may be used which will produce this softening action. Those found most practical consist of heat, solvents or those substances, such as plasticizers, which exert a softening action, or some combination of the foregoing. Where the binder fibers are thermoplastic, having the property of being softened by heat and hardening upon cooling again, these changes in physical condition take place without any material chemical deterioration. Accordingly, a convenient method of effecting unification is to pass the combined cards through a heating chamber, between heated plates or heated rolls, or through any other suitable apparatus capable of raising the temperature of the fibers to the desired degree.

Where the binder fibers used are soluble in, or may be softened by, organic solvents which do not affect the non-binder fibers to any substantial degree, another method of producing the desired union of the fibers consists in subjecting the web, after it has been formed, to the action of such a solvent, or to a solvent vapor or gas, which will develop in situ the adhesive or bonding properties of the binder fibers without materially disturbing or changing their respective positions in the mass. For instance, if the web consists of a mixture of cotton and cellulose acetate fibers, it may be treated with a mixture of acetone and methanol to superficially dissolve or soften the binder fibers. The web may then be passed between pressure rolls. The nature of the solvents employed necessarily will be determined by the character of the binder fibers and other practical considerations. A wide variety of solvents for the various binder fibers above mentioned are known, including acetone, methyl alcohol, methyl cellusolve, propylene oxide, methyl acetate, ethyl acetate, acetic acid, diacetone, chlorobenzene, chloroform, toluol, carbon tetrachloride, and diethyl ether.

Whether or not pressure be used in the unification process will depend chiefly upon the nature of the binder and non-binder fibers used and of the character of the final product desired. Pressing necessarily results in bringing a single binder fiber into contact with a greater number of contiguous fibers of both kinds than otherwise would be the case and thus to increase the number of individual bonds with an accompanying increase in strength. It tends to reduce the softness, flexibility and draping qualities of the product and to give it greater firmness and rigidity. Whether to use pressure, and the degree of pressure to be employed, if it is used, therefore will depend upon the results desired, the nature of the binder and softening agent used and other practical considerations.

That the nature of the bonding, coalescence or association of the fibers with each other produced by the unification may take several forms will be evident from the character of the unification process above described. All of these binder fibers have normally latent adhesive or other coalescent properties which may be developed and made active by any of the unifying agents above discussed. For example, in subjecting the mixed fiber web to a suitable temperature, the thermoplastic fibers will attain a softening stage which, in connection with the application of pressure, is sufficient to effect a unification. Or, the heating step may be carried further until the surfaces of the fibers become sticky, so that when the web is pressed the binder fibers will adhere or weld firmly to other binder fibers and may likewise adhere to the non-binder fibers with which they are in contact. Or, with some kinds of binder fibers, the heating step may be continued still further until the form of the binder is further broken down and the fibers are converted into almost a liquid state, in which case they will wet intersecting non-binder fibers and will unite them upon subsequent cooling. In any of these extremely soft conditions more or less spreading of the binder constituent may be effected, if desired, and even to such a point as to convert some or all of the binder fibers into a discontinuous or continuous non-fibrous film.

Various adhesive tapes can be made because the character of the adhesive tape product can be modified, varied, and controlled through the use of plasticizing agents in the composition of the binder fibers. Such agents are useful not only in facilitating the coalescing process per se and controlling the strength of the bonds, but also in modifying the physical characteristics of the binder fibers in the final product. Such properties as softening point, pliability, toughness, and the like, may be controlled in this way. Consequently, the nature and proportion of the plasticizer or plasticizers used can be selected in accordance with either or both of these requirements. In addition, the character of the final product can be modified or varied by the degree of pressure used in the bonding process, the temperature employed during this step, and by the length of time occupied by it. Plasticizers also may be used to modify any of these factors.

It should be clearly understood that it is not necessary to carry the softening action to such a point that the binder fibers will wet the non-binder fibers or will adhere to them in order to produce a unification entirely satisfactory for many purposes. A softening of the binder constituent to the point where it is plastic but not adhesive, when the pressure is applied, is sufficient for many purposes. Apparently the unification so effected is due to the deforming of the binder fibers while in a softened condition and in some cases the embedding of the non-binder fibers in them. Since the fibers are mutually entangled or interlaced throughout the mass, the act of embedding the non-binder fibers in the binder fibers effects a mechanical engagement of these constituents in such a manner as to produce a coherent body having ample tensile strength and flexibility for adhesive tape use. If the softening of the binder fibers is carried further so that they weld to each other, even though they may not actually adhere with any substantial degree of strength to the cotton or other non-binder fibers, a still stronger product is produced, apparently due to a firmer mechanical entanglement of the latter in the former, coupled with the embedding of a considerable proportion of one in the other. Here the binder material appears to form a three-dimensional net work, maze or framework in which the non-binder fibers are intermingled, intertwined, interlocked, and, at some points, mechanically embedded or otherwise bonded.

Various combinations of this mechanical interlocking with a direct adhesion or welding of the fibers to each other can be produced. It will readily be appreciated that the different relationships which the two types of fibers may be made to assume with reference to each other in these ways has an important bearing on such physical properties as strength, pliability, drape, firmness, porosity, tearing properties and the like, and that they are correspondingly useful in controlling the nature of the final adhesive product. It should be observed that, especially in products having a relatively small per cent of binder fibers at any level, the individual fibers, at least those of the non-binder type, may have considerable freedom of movement relative to their neighbors, except at their points of union, bonding, or coalescence with the binder constituent. While an individual fiber below the surface of a web made by this method may have its freedom of movement restricted by the presence of neighboring fibers due to the density of a particular web, nevertheless if fibers of textile length are used, the fibers may not be bonded together in such way as they are in products which can be made by paper processes, and this relative freedom of the fibers is important in giving to some of the products of this invention characteristics similar to fabrics.

This fiber freedom may take extreme forms such that the product may have a very fluffy, napped, or long fibered surface by reason of a small binder fiber content. Sheet materials resembling outing flannel in general appearance may be produced by this method. Also, with the fibers relatively long, only a small percentage of the fibers in an average batch of uncombed cotton staple as it comes from a carding machine being less than half an inch in length and running from that to one and a quarter inches or more, and since they may have only very few, say one or two, points of anchorage to the binder fibers at some points in some of these products, it is entirely feasible to make adhesive tapes which are very soft and pliable.

The bond, union, or other relationship of the fibers to each other produced by the various methods above described and which is relied upon mainly to give the final adhesive tape its stability and strength is frequently herein designated as "coalescence," and the methods of treatment as "coalescing," whether or not these terms are used in their strict or technical sense. Consequently, where such terms appear hereinafter they will be used to convey the meaning just described.

As above indicated, the strength of the fiber-to-fiber bonds may be increased when desired and the creation of such bonds may be facilitated by using binder fibers which have been treated with a plasticizing agent, or in which a plasticizer has been used in the composition of the fiber. The non-volatile solvents above mentioned are suitable for this purpose. Some of the synthetic resins, such as "glyptals," "vinyls," "santolites," "rezyls" and, in fact, any resin compatible with the material of the fiber used, also may be incorporated in the composition of the fibers to increase the strength of the fiber-to-fiber bond, or to alter otherwise the properties of the fibers.

One example of the production of a web of textile fibers in accordance with this invention, and unified by heat and pressure, is as follows:

A binder fiber having good thermoplastic properties should be selected, such as those prepared from ethyl cellulose, cellulose acetate, polymerized vinyl acetate, polymerized vinyl chloride, or mixtures of these, together with suitable plasticizers if desired. Binder fibers consisting of two parts of cellulose acetate and one part of para-toluene ethyl sulphonamide may be used satisfactorily. The binder fibers may be mixed with cotton fibers in a picker and finisher lapper so that the proportion of binder fiber is, say, seven and one-half per cent. Such a lap may then be fed to a card which works the fiber mixture into the form of a web.

One or more of the laps so formed may then be fed together through a commercial textile 4-roll calender, in which the steel rolls are arranged in a vertical series and are maintained at a temperature of, say 300° to 350° F., with normal calendering pressures.

The web, say a 36 inch width, enters the nip of the two top rolls, passes around and between the two middle rolls, and finally through the nip of the two bottom rolls. A satisfactory speed is twelve yards per minute.

Naturally the proportions of the two general types of fibers used will be varied in accordance with the requirements of the final product desired, it being only essential to include a sufficient percentage of the binder fibers in the batches to give necessary strength and stability to the final adhesive tape desired. Beyond this point the proportion of binder fibers may be increased to anything desired. In fact, for some purposes the entire product may be composed of a single binder fiber, or of mixtures of different kinds of binder fibers. A wider range of adhesive tape products, however, is obtainable by using such mixtures as those above described and by judiciously selecting and proportioning the fibers and adapting the steps of the process to the results desired, such characteristics as strength and pliability, and the relative porosity of the backing can be readily controlled and predetermined.

In addition to the possibility of choosing fibers for imparting certain chemical or physical characteristics to the back surface of the tape or certain physical characteristics for mechanical adhesive anchorage on the interface surface, the fibers may be chosen to afford chemical interface characteristics especially effective in securing a good adhesive bond, especially necessary where the adhesive is to have pressure-sensitive characteristics. The choice of particular binder fibers of varying chemical structure may therefore depend to a large extent upon the type of adhesive mass contemplated for use with the backing material. In the preferred example given, where cellulose binder fibers are used, a rubber or rubber substitute type of pressure-sensitive adhesive is indicated.

On the other hand, the backing may have as the binding fiber a polyvinyl ester fiber, in which case the adhesive may comprise either the rubber-resin or rubber substitute-resin type of adhesive, or a plasticized cellulosic pressure-sensitive adhesive, preferably milled and calendered onto the sheet backing, though the adhesive may, if desired, be solvent spread. Where solvent spreading of the adhesive is contemplated, the predominant fibers adjacent the interface surface on which the adhesive is united may well be of a character that they are partially or wholly soluble in the solvent for the adhesive mass, and/or are compatible with the plasticizers present in the adhesive mass. The compatibility of the interface backing fibers with the plasticizers for the adhesive is equally effective in the case of non-solvent spread adhesive masses, as the compatible adhesive plasticizer may well have such action on the interface fibers as to secure a better adhesion. Where aqueous spreading of the adhesive mass is contemplated, the backing may include fibers which are predominantly water-wettable.

One example of a transparent, pressure-sensitive rubber type adhesive which may be calendered to the preferred form of cellulose acetate, cotton fiber backing, is the following:

| | Parts by weight |
|---|---|
| Vistanex (isobutylene polymer) | 0.5 |
| Rubber (highly plasticized) | 4.5 |
| Hydrogenated glycerol abietate | 2.5 |
| Hydrogenated methyl abietate | .25 |
| Wax | .15 |
| Anti-oxidant | .008 |

Where solvent spreading is to be resorted to rather than calendering, straight Vistanex masses may be used, such as the following:

| | Parts by weight |
|---|---|
| Vistanex medium | 10 |
| Hydrogenated methyl abietate | 1 |
| Hydrogenated rosin | 5 |
| Wax | 1.5 |

This adhesive may be spread with a suitable solvent, such for instance as toluene.

Of course, regular well known rubber-rosin pressure-sensitive adhesives may be used.

In order to prevent sticking of the adhesive mass when the tape is rolled upon itself, the back surface of the backing may be treated either before or after application of the mass to make it resistant to the adhesive mass. Crinkling, creping, embossing, calendering or coating operations, or a combination thereof, may be resorted to. For instance, a plasticized, moisture-proof transparent film of cellulose acetate or nitrocellulose may be applied either by frictioning or solvent spreading, or might be applied simultaneously with an embossing operation. Or rubber coatings, such as chlorinated rubber or rubber hydrochloride, may be applied where the pressure-sensitive adhesive is to be of a cellulosic nature.

Embossing alone, however, is highly effective, for the tape is inherently embossible into a permanently thermo-set configuration which can be obtained both on the external back surface and on the interface. Such embossing or other surface irregularity on the back is an aid in reducing adhesion of a pressure-sensitive mass when the tape is rolled on itself, due to less surface contact. Irregularity on the interface is also an aid in securing interface adhesion by providing more surface area for adhesion, and, where the mass is of uniform thickness on the irregular interface surface, the amount of surface contact of the mass against even a smooth back-surface when the tape is rolled upon itself, is reduced.

Hot surface calendering of the back surface is likewise effective in reducing "picking" of the backing by the adhesive. Such one-sided calendering may be accomplished by passing the material, either during manufacture or as a subsequent operation under pressure between a heated steel roll and a cooperating soft-surface roll, as of fabric. The temperature of the steel roll may be such as to soften the back surface fibers depending upon their character.

Likewise, the backing structure may be subjected to ordinary cloth crinkling or creping processes prior to application of the adhesive, or the tape may be prepared in accordance with a process claimed in a co-pending application of Ziegler & Hoeglund, Serial No. 725,424, to secure a combined crepe in the adhesive and in the backing. In the case of tapes of this invention, the crepe may become permanently thermo-set by application of sufficient heat during the creping process to soften thermoplastic fibers present in the backing and reset them to maintain the tape in a creped configuration with permanent undulations.

In order to improve the anchorage of the adhesive mass to one surface of the material, it is sometimes desirable to prime one surface of the fabric with a material which bonds very strongly to the fabric and which, in turn, serves as an excellent anchoring medium for the adhesive mass. For example, the backing material may be primed on one surface with Vistanex and it will then be observed that a rubber-rosin adhesive mass will anchor very satisfactorily to this surface. This step is especially desirable with fabrics containing a high concentration of binder fibers.

Oftentimes the application of a coating of transparent material will act to accentuate the transparency of the tape as a whole. Where it is desired to provide a tape which is transparent in the sense that it does not conceal writing or designs on the surface to which it is applied, various expedients can be resorted to. For instance, transparent non-binder fibers, as well as transparent binder fibers, having approximately the same index of refraction, may be utilized. A transparent adhesive may thus be spread on the backing, with the adhesive being chosen with due regard to its index of refraction, which should approach as nearly as possible that of the fibers. Likewise, any transparency heightening back film, such as a suitable plasticized lacquer, should have an index of refraction essentially the same as that of the fibers.

This sheet backing material herein described is related to the product and processes described in a co-pending application of Reed, Serial No. 303,021, filed November 6, 1939. These processes contribute toward the possibility of making unique pressure-sensitive adhesive tapes for special uses and with special new properties as a whole, in accordance with this invention.

I claim:

1. An adhesive sheet material including a flexible sheet backing of a textile product composed essentially of a mixture of unspun textile fibers having binder and non-binder characteristics adherently bonded together by the coalescent characteristics of the binder fibers and being secured thereby in a relatively fixed relationship to each other with relatively long lengths of a high proportion of said fibers free from attachment to other fibers, and a pressure-sensitive adhesive united with one surface of said sheet.

2. An adhesive sheet material including a flexible sheet backing composed essentially of different types of textile fibers including thermoplastic cellulose acetate fibers and other non-thermoplastic cellulosic fibers intermingled with each other in an unspun relationship, said fibers being united into a flexible structure by the coalescence of the cellulose acetate fibers with each other at their points of intersection and by their engagement with the other fibers, and a pressure-sensitive adhesive coating on one surface of said backing.

3. An adhesive sheet material including a flexible sheet backing composed essentially of different types of textile fibers including cellulose acetate fibers and cotton fibers intermingled with each other in an unspun relationship, said fibers being united into a flexible structure by the coalescence of the cellulose acetate fibers with each other at their points of intersection and by their engagement with the other fibers, and a pressure-sensitive adhesive coating on one surface of said backing.

4. An adhesive sheet material including a flexible sheet backing of a textile product composed essentially of unspun non-binder textile fibers and plasticized binder textile fibers, the binder fibers uniting the mass of fibers by coalescence at intersecting points into a coherent unitary structure, and an adhesive coating plasticized with a plasticizer compatible with said binder fibers united with one surface of said backing.

5. An adhesive sheet material including a flexible sheet backing of a textile product composed essentially of unspun non-binder textile fibers and plasticized binder textile fibers, the binder fibers uniting the mass of fibers by coalescence at intersecting points into a coherent unitary structure, and a pressure-sensitive adhesive mass plasticized with the same plasticizer as that present in said binder fibers united with a surface of said backing.

6. A creped adhesive sheet material including a flexible sheet backing comprising a mixture of thermoplastic and non-thermoplastic fibers bonded together into a flexible unwoven web, and a pressure-sensitive adhesive coating on one surface of said backing, the combined structure having co-extensive crepings.

RAYMOND E. REED.